Feb. 6, 1962 — J. D. LESLIE — 3,020,392
READING LAMP ASSEMBLY
Filed Aug. 7, 1958 — 2 Sheets-Sheet 1

INVENTOR.
James D. Leslie
BY
ATTORNEY

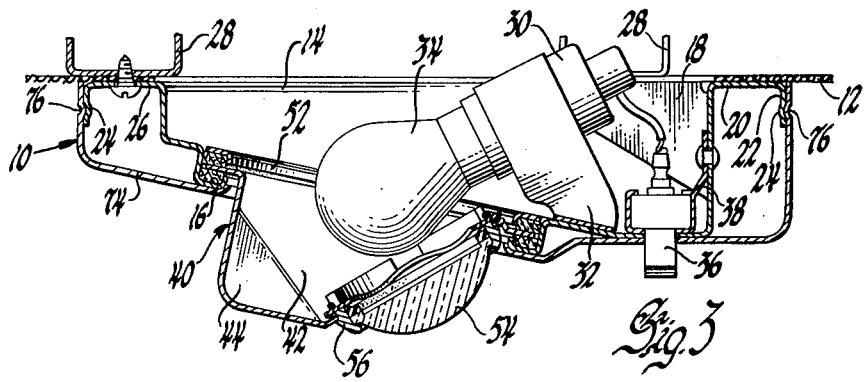
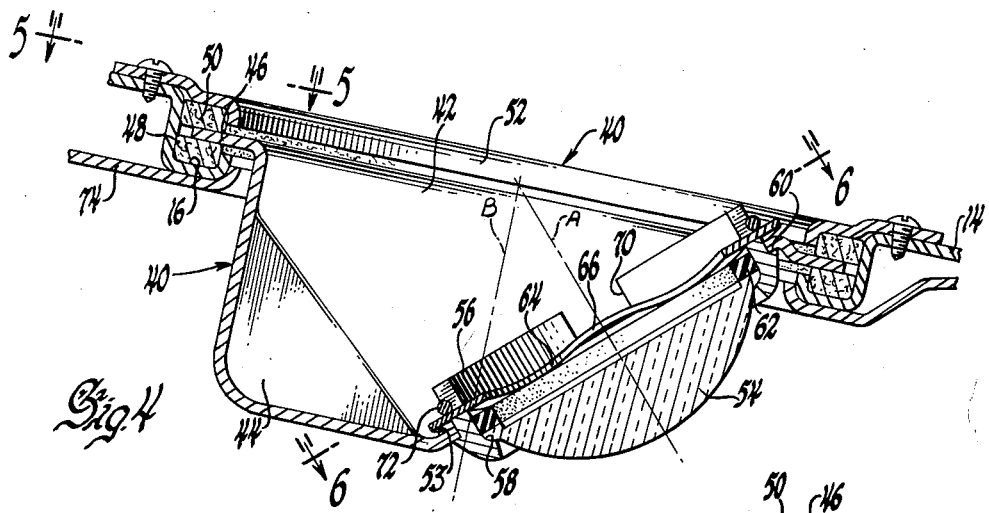
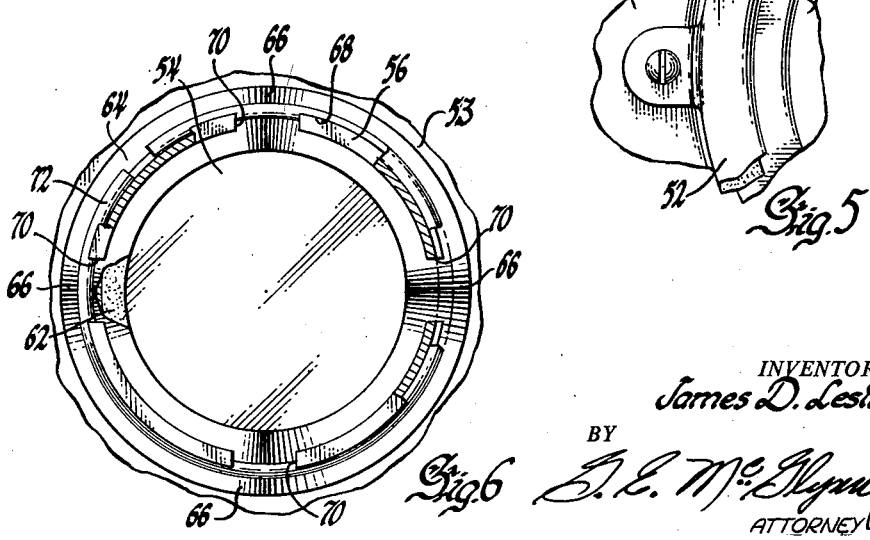

United States Patent Office 3,020,392
Patented Feb. 6, 1962

3,020,392
READING LAMP ASSEMBLY
James D. Leslie, Birmingham, Mich., assignor to General Motors Corporation, Detroit, Mich., a corporation of Delaware
Filed Aug. 7, 1958, Ser. No. 753,688
9 Claims. (Cl. 240—7.35)

This invention relates to a reading lamp assembly and, in particular, to such an assembly which is selectively adjustable to provide a concentrated beam of reading light to various portions of a vehicle passenger compartment.

Heretofore, it has been proposed to provide adjustable reading lamp assemblies for various types of vehicles such as commercial buses, trains, airplanes and automobiles. The most common type of prior proposal has been directed to a structure comprising a socket support member in which a lens-supporting ball member has been universally swivelly adjustably mounted. Such prior constructions have been relatively complicated in construction and difficult to assemble and service.

Therefore, it is a principal object and feature of this invention to provide an improved reading lamp assembly which is relatively simple in construction, easy to assemble and readily serviced.

It is yet another object and feature of this invention to provide a reading lamp assembly comprising a lamp body enclosing a fixed source of illumination, a lens support rotatably adjustably mounted about a fixed axis of rotation on the lamp body, and a light concentrating lens mounted in the lens support so as to have its optical axis disposed at an angle fixed relative to the axis of rotation of the lens support whereby the lens is automatically guided to various areas of a vehicle in which a concentrated beam of reading light is desired.

It is yet another object and feature of this invention to provide a reading lamp assembly of the type aforedescribed in combination with a vehicle passenger compartment, and particularly a conventional automobile passenger compartment, in which the lens support may be manually adjusted about its fixed axis of rotation to sweep a beam of concentrated reading light in a predetermined path between and among the various seats for the vehicle occupants.

These and other objects and features of this invention will appear more fully hereinafter as the description of the invention proceeds, reference being made to the following drawings in which:

FIGURE 3 is a section taken on line 3—3 of FIGURE 2;

FIGURE 4 is an enlarged view of a portion of FIGURE 3 illustrating certain details of the invention;

FIGURE 5 is a fragmentary view taken on line 5—5 of FIGURE 4; and

FIGURE 6 is a fragmentary view, partially in section and partially broken away, taken on line 6—6 of FIGURE 4.

Figure 1:
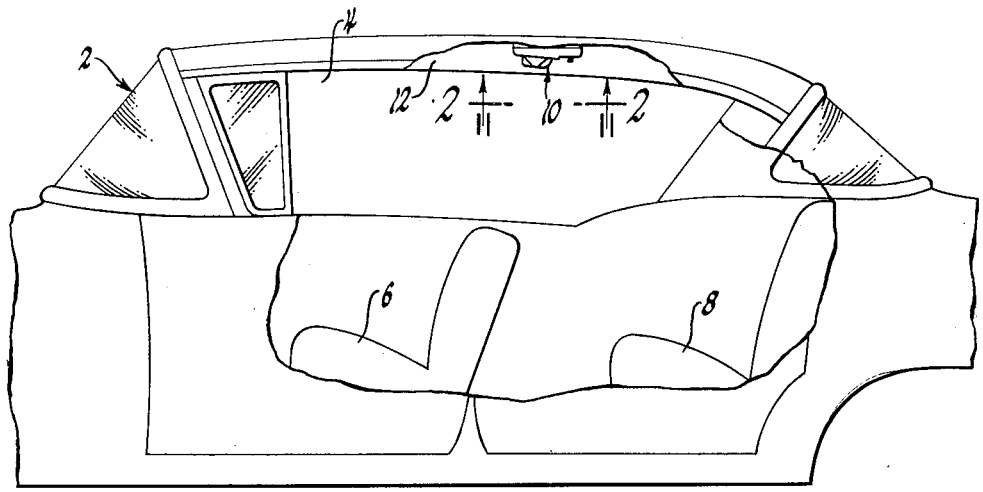
FIGURE 1 is a fragmentary side elevation, with parts broken away, of a vehicle equipped with the invention.

As will appear more fully hereinafter, the present invention may be practiced with practically any passenger vehicle. However, for the purpose of illustrating the invention by way of a preferred embodiment thereof, reference will be made hereinafter to the use of the invention in the passenger compartment of a conventional automobile.

Referring now to the drawings, the numeral 2 indicates a conventional automobile comprising a vehicle passenger compartment 4 having front and rear seats 6 and 8, respectively. The reading lamp assembly 10 of this invention is secured on the ceiling 12 of the passenger compartment.

Figure 2:
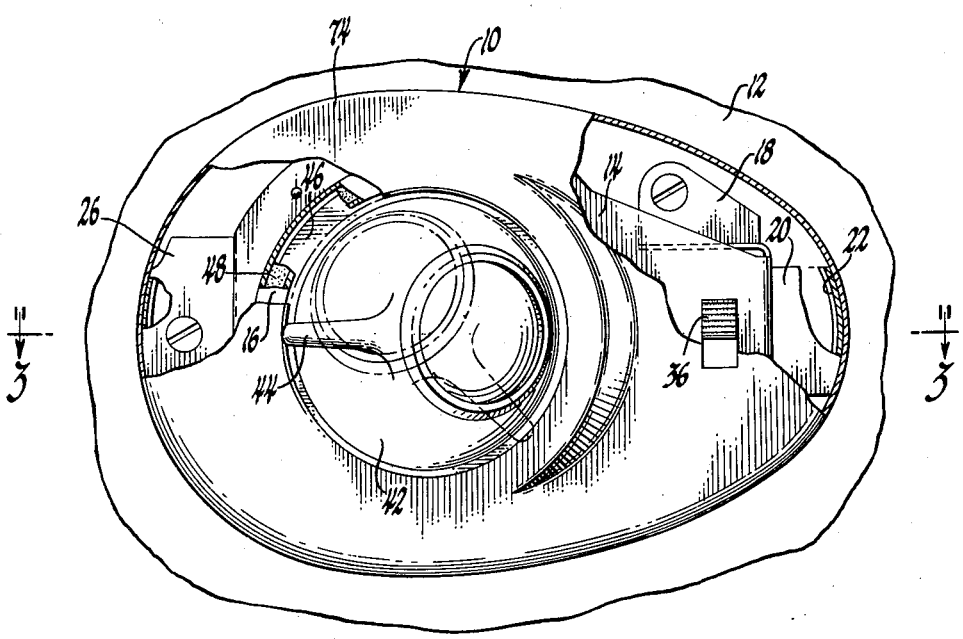
FIGURE 2 is an enlarged view taken on line 2—2 of FIGURE 1 with parts broken away and in section to illustrate certain details of the invention.

Referring particularly to FIGURES 2, 3 and 4, the assembly 10 comprises a lamp body 14 suitably formed to define an annular channel-shaped shoulder or mounting flange 16 delineating an opening in the body. At one end of the body member there are a pair of laterally spaced upstanding brackets 18 and an outwardly projecting tab 20 therebetween having a curved depending skirt 22 with a horizontally extending groove or notch 24 therein. At the other end of the lamp body there is provided another tab 26 having a depending skirt curved similar to the tab 20, and also provided with a horizontal notch or groove 24. The brackets 18 and tab 26 are apertured to receive suitable fasteners such as screws for mounting the body to the roof bows 28 on the ceiling of the vehicle passenger compartment.

A lamp socket 30 is suitably supported within an upstanding substantially U-shaped bracket 32 having its lower legs suitably secured as by spotwelding to the lamp body. As will be apparent from the drawings, a light source such as the bulb 34 is adapted to be received and retained in the conventional manner in the socket 30. A manually actuable switch 36 of any suitable type is carried by a bracket 38 riveted or otherwise suitably secured interiorly of the lamp body 14 as is indicated in the drawing. Naturally, the switch is provided with suitable electrical contact members adapted to be connected to the bulb socket 30 to establish a lighting circuit.

The lens support assembly 40 as shown particularly in FIGURES 4 through 6 includes a lens support or housing member 42 which is generally cup-shaped in configuration and provided with a relatively narrow rib 44 adapted to be grasped for manual adjustment of the position of the lens as will appear hereinafter. The lens support 42 includes an annular shoulder or mounting flange 46 adapted to be disposed interiorly of the lamp body 14 opposite the channel-shaped mounting flange 16. Suitable bearing means, in this case an annular felt pad 48, is mounted within the channel-shaped mounting flange 16 between the latter and lens support flange 46. A second felt bearing pad 50 rests upon the upper surface of the lens support mounting flange between the latter and an annular retaining ring 52 suitably secured as by screws to the lamp body 14. Thus, the lens support 42 is suitably mounted to the lamp body so as to form a closure for the aforementioned body opening. The felt material comprising the bearing means 48 and 50 frictionally engages flange 46 but yields to permit manual adjustment of the lens support 42 upon grasping the rib 44. In so adjusting the lens support 42, the latter is restrained to move about a fixed axis of rotation substantially normal to the planes of bearing pads 48 and 50 as indicated at A. The felt bearing pads or their equivalent act to yieldably frictionally retain the lens support 42 in any selected adjusted position.

The lower portion of the lens support 42 is formed with an annular flange or shoulder 53 defining an opening in the support through which light from the source 34 may be directed to a light-concentrating lens 54 of suitable optical characteristics. The lens 54 is adapted to be mounted in the opening in the lens support so that its optical axis B is at a fixed angle with respect to the axis A of lens support rotation W.

The lens-supporting structure includes an annular mounting ring 56 provided with a lower annular lip 58 seating against the periphery of the lens. The mounting ring 56 is insertable into the lens support opening until such time as an annular stop shoulder 60 engages the outer surface of the flange 53. A suitable gasket 62 is seated against the interior surface of the lens periphery. A wavy spring washer 64 is seated within the lens support 42 so as to rest against the flange 53 and gasket 62. The spring washer of the preferred embodiment is provided with four circumferentially spaced webs 66 located at the crest of each of four waves, and define with the rest of the washer structure four arcuate openings 68 adapted to receive the inner edge of the mounting ring 56. The mounting ring is provided on its inner edge with four spaced notches 70 corresponding to the number of webs 66 so as to receive the latter. An annular groove on the exterior side wall of the inner end of the mounting ring is adapted to lockingly receive a split resilient snap ring 72 so as to maintain the mounting ring stop shoulder 60 in engagement with the lens support due to the action of the spring washer.

An annular escutcheon or trim member 74 includes an aperture adapted to receive the operating portion of the switch 36, and has ribs 76 at either end of the side wall thereof adapted to releasably lock in the grooves 24 on the body member 14.

From the above description, it will be apparent that most of the major components of the assembly may be manufactured by relatively inexpensive methods such as stamping operations. Moreover, the parts are so interrelated as to provide convenient sub-assemblies which facilitate the assembly operation. For example, the lens support 40, lens 54 and the retaining means for the latter may be joined to form one sub-assembly. It will also be noted that the light source and its socket are fixedly mounted on the lamp body so as to form still another sub-assembly. Additionally, the lens support assembly 40 may be pre-assembled to the lamp body to form still another sub-assembly which may be finally assembled to the ceiling of the vehicle passenger compartment as desired.

It will be understood that, in assembling the reading lamp within the vehicle passenger compartment, the axis of adjustment A of the lens support 40 will be so positioned relative to the vehicle seats 6 and 8 to insure that manual adjustment of the lens support will sweep the optical axis B of the light-concentrating reading lens 54 among and between various portions of the seats to be occupied. Thus, when once installed, the direction of the beam of concentrated reading light may be adjusted from the rear to the front seat as indicated in FIGURE 2 merely by grasping the rib 44 so as to rotate the lens support about the axis of adjustment A. Due to preselecting the mounting position of the lamp assembly, and the fact that the optical axis of the lens is at a fixed angle with respect to the axis of adjustment, there is in effect provided a predetermined path for the reading light which will fall upon any desired portion of the seats.

Having disclosed a preferred embodiment of the invention for the purpose of illustration, it is to be understood that various modifications thereof will now occur to those skilled in the art. Therefore, the invention is not to be limited by the preferred embodiment illustrated, but only by the claims which follow.

I claim:
1. A reading lamp assembly comprising a lamp body having an opening therein, a light source fixedly secured to and positioned within said body, a lens support rotatably adjustably mounted on said lamp body for movement about a fixed axis and in every position thereof forming a closure for said body opening, means acting between said lamp body and lens support to releasably retain the latter in any selected adjusted position, and a light-concentrating lens mounted on said support with its optical axis at a fixed angle to the axis of rotation of said support.

2. A reading lamp assembly comprising a lamp body having shoulder means defining a body opening, a light source fixedly secured to and positioned within said body, a lens support rotatably adjustably mounted on said lamp body for movement about a fixed axis and forming a closure for said body opening, shoulder means on said lens support disposed opposite said body shoulder means for mounting said lens support, means acting between said body and lens support shoulder means to releasably retain said support in any selected adjusted position, and a light-concentrating lens having its optical axis mounted in said lens support at a fixed angle to the axis of rotation of said support.

3. A reading lamp assembly comprising a lamp body having shoulder means defining a body opening, a light source fixedly secured to and positioned within said body, a lens support rotatably adjustably mounted on said lamp body for movement about a fixed axis and forming a closure for said body opening, shoulder means on said lens support spaced from and disposed opposite said body shoulder means for mounting said lens support, means interposed between said body and lens support shoulder means to yieldably frictionally retain said support in any selected adjusted position, and a light-concentrating lens having its optical axis mounted in said lens support at a fixed angle to the axis of rotation of said support.

4. A reading lamp assembly comprising a lamp body having an opening therein, a light source fixedly secured to and positioned within said body, a lens support rotatably adjustably mounted on said lamp body for movement about a fixed axis and in every position thereof forming a closure for said body opening, bearing means interposed between said lens support and said body to yieldably frictionally maintain said lens support in any selected adjusted position, a light-concentrating lens, means mounting said lens in said support with the optical axis of said lens at a fixed angle to the axis of rotation of said lens support, said last-named means comprising a mounting ring supportable on said lens support and including a shoulder engaging the periphery of said lens, and means removably supporting said mounting ring on said lens support.

5. A reading lamp assembly comprising a lamp body having an opening therein, a light source fixedly secured to and positioned within said body, a lens support rotatably adjustably mounted on said lamp body for movement about a fixed axis and in every position thereof forming a closure for said body opening, bearing means interposed between said lens support and said body to yieldably frictionally maintain said lens support in any selected adjusted position, a light-concentrating lens, means mounting said lens in said support with the optical axis of said lens at a fixed angle to the axis of rotation of said lens support, said last-named means comprising a mounting ring extending into said lens support and including a shoulder engaging the periphery of said lens, and annular spring means mounted within said lens support and engaging the inner end of said mounting ring to releasably support the latter.

6. A reading lamp assembly comprising a lamp body having an opening therein, a light source fixedly secured to and positioned within said body, a lens support rotatably adjustably mounted on said lamp body for movement about a fixed axis and in every position thereof forming a closure for said body opening, bearing means interposed between said lens support and said body to yieldably frictionally maintain said lens support in any selected adjusted position, a light-concentrating lens, means mounting said lens in said support with the optical axis of said lens at a fixed angle to the axis of rotation of said lens support, said last-named means comprising a mounting ring extending into said lens support and including a shoulder engaging the periphery of said lens, an annular wavy spring mounted within said lens support, the inner end of said mounting ring extending through apertures in said wavy spring, and a resilient retaining ring mounted on the inner end of said mounting ring for cooperating retaining engagement with said wavy spring.

7. A reading lamp assembly comprising a lamp body having an annular mounting flange defining a body opening, a light source fixedly secured to and positioned within said body, a lens support rotatably adjustably mounted on said lamp body for movement about a fixed axis and forming a closure for said body opening, an annular flange on said lens support disposed opposite said body mounting flange for mounting said lens support, retaining means secured to said lamp body on the side of said lens support flange opposite from said body mounting flange, bearing means interposed between said lens support flange and, respectively, said body mounting flange and retaining means to yieldably frictionally maintain said lens support in any selected adjusted position, and a light-concentrating lens mounted within said lens support with the optical axis of said lens at a fixed angle to the axis of rotation of said lens support.

8. A reading lamp assembly comprising a lamp body having an annular mounting flange defining a body opening, a light source fixedly secured to and positioned within said body, a lens support rotatably adjustably mounted on said lamp body for movement about a fixed axis and forming a closure for said body opening, an annular flange on said lens support disposed opposite said body mounting flange for mounting said lens support, retaining means secured to said lamp body on the side of said lens support flange opposite from said body mounting flange, bearing means interposed between said lens support flange and, respectively, said body mounting flange and retaining means to yieldably frictionally maintain said lens support in any selected adjusted position, a light-concentrating lens, means removably mounting said lens in said support with the optical axis of said lens at a fixed angle to the axis of rotation of said lens support, said last-named means comprising a mounting ring extending into said lens support and including a shoulder engaging the periphery of said lens, an annular wavy spring mounted within said lens support, the inner end of said mounting ring extending through apertures in said wavy spring, and a resilient retaining ring mounted on the inner end of said mounting ring for cooperating retaining engagement with said wavy spring.

9. In combination with a vehicle passenger compartment having plural spaced front and rear seats for occupants, a reading lamp assembly; said assembly comprising a lamp body having an opening therein, means for securing said lamp body within the interior of said passenger compartment, a light source fixedly secured to and positioned within said lamp body, a lens support rotatably mounted on said lamp body for movement about a fixed axis and in every position thereof forming a closure for said body opening, means acting between said lamp body and lens support to releasably retain the latter in any selected adjusted position, and a light-concentrating lens mounted in said lens support with the optical axis of said lens at a fixed angle to the axis of rotation of said lens support whereby, upon rotation of said lens support, a beam of concentrated light will sweep between said seats.

References Cited in the file of this patent
UNITED STATES PATENTS

| | | |
|---|---|---|
| 1,110,910 | Elliot | Sept. 15, 1914 |
| 1,678,137 | Douglas | July 24, 1928 |
| 1,678,332 | Drayer | July 24, 1928 |
| 2,172,248 | Kost | Sept. 5, 1939 |
| 2,243,712 | Levy | May 27, 1941 |
| 2,307,977 | Wellman | Jan. 12, 1943 |
| 2,525,977 | Tinnerman | Oct. 17, 1950 |
| 2,587,807 | Arenberg et al. | Mar. 4, 1952 |
| 2,622,189 | Rahn | Dec. 16, 1952 |
| 2,782,295 | Schwenkler | Feb. 19, 1957 |